United States Patent
Dou et al.

(10) Patent No.: US 12,393,538 B2
(45) Date of Patent: Aug. 19, 2025

(54) AXI BUS STRUCTURE AND CHIP SYSTEM

(71) Applicant: AXERA TECHNOLOGY (SHANGHAI) CO., LTD., Shanghai (CN)

(72) Inventors: Xiong Dou, Shanghai (CN); Yi Li, Shanghai (CN)

(73) Assignee: AXERA TECHNOLOGY (SHANGHAI) CO., LTD., Shanghai (CN)

(*) Notice: Subject to any disclaimer, the term of this patent is extended or adjusted under 35 U.S.C. 154(b) by 198 days.

(21) Appl. No.: 18/042,881

(22) PCT Filed: Dec. 2, 2021

(86) PCT No.: PCT/CN2021/135191
§ 371 (c)(1),
(2) Date: Feb. 24, 2023

(87) PCT Pub. No.: WO2022/121783
PCT Pub. Date: Jun. 16, 2022

(65) Prior Publication Data
US 2023/0334000 A1    Oct. 19, 2023

(30) Foreign Application Priority Data

Dec. 11, 2020    (CN) .......................... 202011463344.8

(51) Int. Cl.
G06F 13/368    (2006.01)
G06F 13/42    (2006.01)

(52) U.S. Cl.
CPC ............ *G06F 13/368* (2013.01); *G06F 13/42* (2013.01)

(58) Field of Classification Search
CPC ............................... G06F 13/368; G06F 13/42
(Continued)

(56) References Cited

U.S. PATENT DOCUMENTS 10,608,640 B1 *   3/2020   Orthner ............... G06F 13/4282
10,628,622 B1     4/2020   Sivaraman et al.
(Continued)

FOREIGN PATENT DOCUMENTS

CN    102216920 A    10/2011
CN    105912492 A    8/2016
(Continued)

OTHER PUBLICATIONS

International Search Report dated Mar. 1, 2022, pertaining to Int'l Patent Application No. PCT/CN2021/135191, 11 pgs.
(Continued)

*Primary Examiner* — Titus Wong
(74) *Attorney, Agent, or Firm* — Dinsmore & Shohl LLP

(57) ABSTRACT

An AXI bus structure and a chip system. The AXI bus structure includes: at least two master functional unit groups, each of which including at least two master functional units; at least two first routing units, being in one-to-one correspondence with the at least two first routing units, and each of the first routing units being respectively connected to each master functional unit of the corresponding master functional unit group by an AXI bus; at least two second routing units, each second routing unit being respectively connected to each first routing unit by an AXI bus; at least two slave functional unit groups, each slave functional unit group including at least two second slave functional units, which being in one-to-one correspondence with the second routing units, and each second routing unit being respectively connected to each slave functional unit of the corresponding slave functional unit group by an AXI bus.

19 Claims, 4 Drawing Sheets

(58) Field of Classification Search
USPC .......................................................... 710/110
See application file for complete search history.

(56) References Cited

U.S. PATENT DOCUMENTS

| | | | | |
|---|---|---|---|---|
| 10,673,439 | B1* | 6/2020 | Ahmad | ............ H03K 19/17736 |
| 10,817,627 | B1 | 10/2020 | Agarwal et al. | |
| 2006/0271715 | A1 | 11/2006 | Harris et al. | |
| 2008/0086572 | A1* | 4/2008 | Tune | ........................ H04L 45/28 |
| | | | | 709/238 |
| 2008/0235415 | A1* | 9/2008 | Clark | .................. G06F 30/3312 |
| | | | | 710/105 |
| 2009/0300382 | A1* | 12/2009 | Bruce | .................... G06F 1/3203 |
| | | | | 713/324 |
| 2012/0303849 | A1* | 11/2012 | Xia | ......................... G06F 13/38 |
| | | | | 710/110 |
| 2014/0122833 | A1* | 5/2014 | Davis | .................. G06F 9/44505 |
| | | | | 712/E9.002 |
| 2015/0236870 | A1* | 8/2015 | Lee | ..................... G06F 13/4068 |
| | | | | 370/257 |
| 2017/0068639 | A1* | 3/2017 | Davis | ..................... H04L 49/109 |
| 2017/0242813 | A1* | 8/2017 | Manikfan | ............. G06F 13/364 |
| 2018/0089128 | A1* | 3/2018 | Nicol | ................... G06F 13/4221 |

FOREIGN PATENT DOCUMENTS

| | | |
|---|---|---|
| CN | 111666239 A | 9/2020 |
| CN | 112579501 A | 3/2021 |
| CN | 214151698 U | 9/2021 |
| KR | 20180063933 A | 6/2018 |

OTHER PUBLICATIONS

Chinese Application No. 202011463344.8, Notice of First Examination Opinion, dated Oct. 31, 2024.

Wang, Jian et al., Research of High Speed Communication Architecture about Inter-core of Multi-core Processors, Electronics & Packaging, vol. 11, No. 6, 2011.

Xu, Chuan-pei et al., The Design of NoC Router Based on FPGA, Microelectronics & Computer, vol. 29, No. 8, Aug. 2012.

* cited by examiner

AXI BUS STRUCTURE AND CHIP SYSTEM

CROSS REFERENCE TO RELATED APPLICATIONS

The present application is a National Phase Entry of International Patent Application No. PCT/CN2021/135191 filed Dec. 2, 2021, which claims priority to Chinese Patent Application No. 202011463344.8, entitled "AXI Bus Structure and Chip System", filed with China National Intellectual Property Administration on Dec. 11, 2020, the entire contents of which are incorporated herein by reference.

TECHNICAL FIELD

The present application relates to the field of chip technologies, and particularly to an AXI bus structure and a chip system.

BACKGROUND ART

A network on chip refers to a connection relationship between systems or modules in a chip, and is mainly used for realizing data exchange between subsystems or functional modules in the chip. In an AI processing chip, enormous data throughput requirements bring many challenges to a design of the network on chip. For example, in a multi-core neural network processing unit (NPU), there exist huge bandwidth requirements for data interaction between plural cores and data interaction with an on chip memory (OCM). In order to support a high bandwidth, a high clock frequency and a large bus bit width become basic characteristics of the network on chip of the AI processor. Meanwhile, a number of the interconnection buses starts to become huge due to the plural cores, which brings a serious congestion problem to back-end implementation of the chip.

SUMMARY

Embodiments of the present application provide an AXI bus structure and a chip system, which can reduce a number of interconnected AXI buses and eliminate a congestion problem of back-end implementation of a chip.

Some embodiments of the present application provide an AXI bus structure, which may include:
   at least two master functional unit groups, wherein each of the master functional unit groups includes at least two master functional units;
   at least two first routing units, wherein the at least two master functional unit groups are in one-to-one correspondence with the at least two first routing units, and each of the first routing units is respectively connected to each of the master functional units of the corresponding master functional unit group by means of an AXI bus;
   at least two second routing units, wherein each of the second routing unit is respectively connected to each of the first routing unit by means of an AXI bus; and
   at least two slave functional unit groups, wherein each of the slave functional unit groups includes at least two second slave functional units, the at least two slave functional unit groups are in one-to-one correspondence with the at least two second routing units, and each of the second routing units is respectively connected to each of the slave functional units of the corresponding slave functional unit group by means of an AXI bus.

Optionally, in the AXI bus structure according to the embodiment of the present application, each of the first routing units includes at least two first routing nodes sequentially connected by means of an AXI bus, and each of the second routing units includes at least two second routing nodes sequentially connected by means of an AXI bus;
   the at least two second routing nodes of each of the second routing units may be in one-to-one correspondence with the at least two first routing units, and each of the second routing nodes is connected to one first routing node of the corresponding first routing unit by means of an AXI bus.

Optionally, in the AXI bus structure according to the embodiment of the present application, each of the first routing nodes may be connected to at least one of the second routing nodes.

Optionally, in the AXI bus structure according to the embodiment of the present application, a number of the first routing nodes of the first routing unit may be different from a number of the second routing nodes in each of the second routing units.

Optionally, in the AXI bus structure according to the embodiment of the present application, the AXI bus may include a write address/data channel, a read address channel, a read data channel, and a write reply channel;
   each of the first routing nodes may include: a first downlink child node located on the write address/data channel, a second downlink child node located on the read address channel, a first uplink child node located on the read data channel, and a second uplink child node located on the write reply channel;
   in the same first routing unit, the first downlink child nodes of the at least two first routing nodes may be connected in sequence, the second downlink child nodes of the at least two first routing nodes may be connected in sequence, the first uplink child nodes of the at least two first routing nodes may be connected in sequence, and the second uplink child nodes of the at least two first routing nodes may be connected in sequence; and
   each of the first downlink child node, the second downlink child node, the first uplink child node, and the second uplink child node may have one end connected to the corresponding master functional unit, and the other end connected to the corresponding second routing node.

Optionally, in the AXI bus structure according to the embodiment of the present application, each of the second routing nodes may include: a third downlink child node located on the write address/data channel, a fourth downlink child node located on the read address channel, a third uplink child node located on the read data channel and a fourth uplink child node located on the write reply channel;
   in the same second routing unit, the third downlink child nodes of the at least two second routing nodes may be connected in sequence, the fourth downlink child nodes of the at least two second routing nodes may be connected in sequence, the third uplink child nodes of the at least two second routing nodes may be connected in sequence, and the fourth uplink child nodes of the at least two second routing nodes may be connected in sequence;
   an input end of the third downlink child node is connected with an output end of the first downlink child node, an input end of the fourth downlink child node is connected with an output end of the second downlink child node, one end of the third uplink child node is connected with the first uplink child node, and one end of the fourth uplink child node is connected with the second uplink child node; the other end of each of the third downlink child node, the fourth downlink child node, the third uplink child node and the fourth uplink child node may be connected to the corresponding slave functional unit respectively.

Optionally, in the AXI bus structure according to the embodiment of the present application, a first preset child node may include a master demultiplexer and a master arbiter;

the master demultiplexer may be configured to access information transmitted by other nodes connected thereto, and transmit the information to the master arbiter or another node connected thereto;

the master arbiter may be configured to receive the information transmitted by the demultiplexer or the information transmitted by other first preset child nodes, and output the information to other nodes connected thereto;

node types of the first preset child node may be: the first uplink child node, the first downlink child node, the second uplink child node, the second downlink child node, the third uplink child node, the third downlink child node, the fourth uplink child node or the fourth downlink child node, and a number of the same type of first preset child nodes connected with the first preset child nodes is one.

Optionally, in the AXI bus structure according to the embodiment of the present application, a second preset child node may include a master demultiplexer, a master arbiter, a bypass demultiplexer, and a bypass arbiter;

the master demultiplexer may be configured to access information transmitted by other nodes connected thereto, and transmit the information to the master arbiter, the bypass arbiter, and/or another node connected thereto;

the master arbiter may be configured to receive the information transmitted by the demultiplexer and the information transmitted by the bypass demultiplexer and/or other child nodes, and output the information to the nodes connected thereto;

the bypass demultiplexer may be configured to access information transmitted by other nodes connected thereto, and transmit the information to the master arbiter or the bypass arbiter;

the bypass arbiter may be configured to access information transmitted by the master demultiplexer and the bypass demultiplexer, and transmit the information to other nodes connected thereto;

node types of the second preset child node may be: the first uplink child node, the first downlink child node, the second uplink child node, the second downlink child node, the third uplink child node, the third downlink child node, the fourth uplink child node or the fourth downlink child node, and a number of the same type of second preset child nodes connected with the second preset child nodes is at least two.

Optionally, in the AXI bus structure according to the embodiment of the present application, the master functional unit may be a processor, an accelerator, a coprocessor, or a DMA controller.

Optionally, in the AXI bus structure according to the embodiment of the present application, the slave functional unit group may be a memory, and the slave functional unit may be one storage unit of the memory.

Optionally, in the AXI bus structure according to the embodiment of the present application, different first routing nodes may be configured with different numbers of first in first out (FIFO) queues, and the FIFO queues on different first routing nodes have different depths.

Optionally, in the AXI bus structure according to the embodiment of the present application, different second routing nodes may be configured with different numbers of FIFO queues, and the FIFO queues on different second routing nodes may have different depths.

Other embodiments of the present application further provide a chip system, which may include any of the AXI bus structures described above.

From the above, in the AXI bus structure according to the embodiment of the present application, plural master functional units are grouped into one group, plural slave functional units are grouped into one group, and the plural master functional units in one group share one routing network formed by plural first routing units to interact with a routing network formed by plural second routing units, so as to access each slave functional unit, thereby reducing a number of the interconnected AXI buses, and eliminating the congestion problem of back-end implementation of the chip.

BRIEF DESCRIPTION OF DRAWINGS

To describe the technical solutions in the embodiments of the present application more clearly, the following briefly describes the accompanying drawings required in the embodiments of the present application. It should be understood that the following accompanying drawings show merely some embodiments of the present application and therefore should not be considered as limiting the scope, and a person of ordinary skill in the art may still derive other related drawings from these accompanying drawings without creative efforts.

DETAILED DESCRIPTION

The technical solutions in the embodiments of the present application are clearly and completely described with reference to the accompanying drawings in the embodiments of the present application.

In descriptions of the present application, it should be noted that, orientations or positional relationships indicated by terms "inner", "outer", etc. are based on orientations or positional relationships shown in the accompanying drawings, or orientations or positional relationships of conventional placement of the product according to the present application in use, and they are used only for describing the present application and for description simplicity, but do not indicate or imply that an indicated device or element must have a specific orientation or be constructed and operated in a specific orientation. Therefore, it cannot be understood as a limitation on the present application. In addition, the terms such as "first", "second", or the like, are only used for distinguishing descriptions and are not intended to indicate or imply relative importance.

It should be further noted that unless specified or limited otherwise, the terms "provided" and "connected" are used broadly, and may be, for example, fixed connections, detachable connections, or integral connections; may be direct connections or indirect connections via intervening structures; may also be communication of two elements. The above terms can be understood by those skilled in the art according to specific situations.

Figure 1:
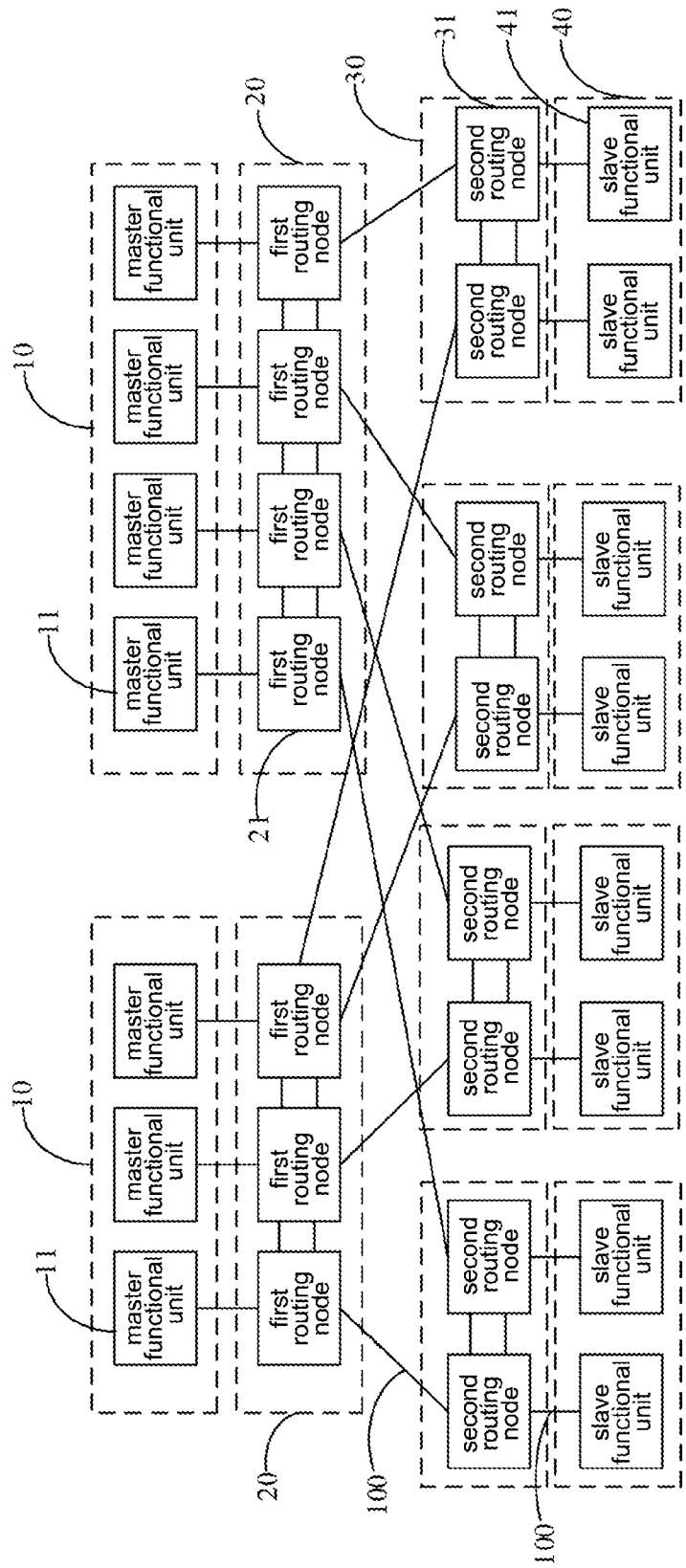
FIG. 1 is a schematic structural diagram of an AXI bus structure according to some embodiments of the present application.

Reference is made to FIG. 1 which is a schematic structural diagram of an AXI bus structure according to some embodiments of the present application.

In the above, the AXI bus structure may include: at least two master functional unit groups 10, at least two first routing units 20, at least two second routing units 30 and at least two slave functional unit groups 40.

In the above, each of the master functional unit groups 10 may include at least two master functional units 11. The at least two master functional unit groups 10 are in one-to-one correspondence with the at least two first routing units 20, and each of the first routing units 20 is respectively connected to each of the master functional units 11 of the corresponding master functional unit group 10 by means of an AXI bus 100. Each of the second routing units 30 is connected to each of the first routing units 20 by means of an AXI bus 100; each of the slave functional unit groups 40 includes at least two second slave functional units 41, the at least two slave functional unit groups 40 are in one-to-one correspondence with the at least two second routing units 30, and each of the second routing units 30 is connected to each of the slave functional unit 41 of the corresponding slave functional unit group 40 by means of an AXI bus 100.

In some embodiments, the master functional units 11 of each of the master functional unit groups 10 may be different or same functional units. For example, the master functional unit 11 may be a processor, a direct memory access (DMA) controller, a neural network processing unit (NPU), or the like, which is of course not limited thereto. A number of the master functional units 11 in each of the master functional unit groups 10 may be 3, 4, or other numbers. Herein, a number of the master functional unit groups 10 is 2 in the present embodiment, but may be of course other numbers. In the present embodiment, there are two master functional unit groups 10 in total, wherein one master functional unit group 10 includes 3 master functional units 11, and the other master functional unit group 10 includes 4 master functional units 11.

In some embodiments, the first routing unit 20 may include at least two (for example, 2, 3, or more than 3) first routing nodes 21. The at least two first routing nodes 21 are connected in sequence. Certainly, in some embodiments, the at least two first routing nodes 21 may also have other connection manners, such as a star connection, or the like.

In the above, the at least two first routing nodes 21 may be connected with the at least two master functional units 11 of the corresponding master functional unit group 10 in a one-to-one correspondence; certainly, it may also not be one-to-one correspondence, for example, the number of the first routing nodes 21 may be greater than the number of the master functional units 11 of the corresponding master functional unit group 10. Or, the number of the first routing nodes 21 may be less than the number of the master functional units 11 of the corresponding master functional unit group 10, and in which case, some first routing nodes 21 are connected with two or more master functional units 11.

In the above, the second routing unit 30 may include at least two (for example, 2, 3, or more than 3) second routing nodes 31. The at least two second routing nodes 31 are connected in sequence. Certainly, in some embodiments, the at least two second routing nodes 31 may also have other connection manners, such as a star connection, or the like.

In the above, the at least two second routing nodes 31 of the second routing unit 30 may be connected with the at least two slave functional units 11 in one-to-one correspondence; that is, the number of the second routing nodes 31 of the second routing unit 30 is equal to the number of the slave functional units 11 of the slave functional unit group 10 corresponding thereto. Certainly, the at least two second routing nodes 31 of the second routing unit 30 may not be in one-to-one correspondence with the at least two slave functional units 11, for example, the number of the second routing nodes 31 may be greater than the number of the slave functional units 41 of the corresponding slave functional unit group 40.

In the above, the at least two second routing nodes 31 of each of the second routing units 30 are in one-to-one correspondence with the at least two first routing units 20, and each of the second routing nodes 31 is connected to one first routing node 21 of the corresponding first routing unit 20. As shown in FIG. 1, the number of the second routing nodes 31 of each of the second routing units 30 is two, and correspondingly, the number of the first routing units 20 is two; certainly, the present application is not limited thereto.

In some embodiments, the slave functional unit group 40 includes at least two slave functional units 41, and the at least two slave functional units 41 of each of the slave functional unit groups 40 are connected with the at least two second routing nodes 31 of the corresponding second routing unit 30 in one-to-one correspondence; that is, the number of the slave functional units 41 of each of the slave functional unit groups 40 is equal to the number of the second routing nodes 31 of the corresponding second routing unit 30. Certainly, different slave functional unit groups 40 may have equal or unequal numbers of slave functional units 41.

In the above, the at least two slave functional unit groups 40 may belong to a same memory or a plurality of memories, and each of the slave functional units 41 is a storage unit of the memory.

In some embodiments, the AXI bus 100 may include a write address/data channel, a read address channel, a read data channel, and a write reply channel.

In the above, each of the first routing nodes 21 and each of the second routing nodes 31 include four child nodes respectively, and the four child nodes are in one-to-one correspondence with the write address/data channel, the read address channel, the read data channel, and the write reply channel.

Specifically, the first routing node 21 may include: a first downlink child node located on the write address/data channel, a second downlink child node located on the read address channel, a first uplink child node located on the read data channel, and a second uplink child node located on the write reply channel; in the same first routing unit, the first downlink child nodes of the at least two first routing nodes are connected in sequence, the second downlink child nodes of the at least two first routing nodes are connected in sequence, the first uplink child nodes of the at least two first routing nodes are connected in sequence, and the second uplink child nodes of the at least two first routing nodes are connected in sequence; herein, in the same first routing unit, the first downlink child nodes of the at least two first routing nodes may be sequentially cascaded, or may also be interconnected in pairs, or may have other star connection manners, and certainly, the sequential cascading is optimal. Certainly, the second downlink child nodes in the same first routing unit may be sequentially cascaded, or may also be interconnected in pairs, or may have other star connection manners, and certainly, the sequential cascading is optimal. The first uplink child nodes in the same first routing unit may be sequentially cascaded, or may also be interconnected in pairs, or may have other star connection manners, and certainly, the sequential cascading is optimal. The second uplink child nodes in the same first routing unit may be sequentially cascaded, or may also be interconnected in pairs, or may have other star connection manners, and certainly, the sequential cascading is optimal.

In the above, each of the first downlink child node, the second downlink child node, the first uplink child node, and the second uplink child node has one end connected to the corresponding master functional unit 11, and the other end connected to the corresponding second routing node 31. Specifically, input end of each of the first downlink child node and the second downlink child node is connected to the master functional unit, and output end of each of the first downlink child node and the second downlink child node are connected to the corresponding second routing node. Each of the input ends of the first uplink child node and the second uplink child node is connected with the second routing node, and each of the output ends of the first uplink child node and the second uplink child node is connected with the master functional unit.

Specifically, each of the second routing node 31 may include: a third downlink child node located on the write address/data channel, a fourth downlink child node located on the read address channel, a third uplink child node located on the read data channel and a fourth uplink child node located on the write reply channel; in the same second routing unit, the third downlink child nodes of the at least two second routing nodes are connected in sequence, the fourth downlink child nodes of the at least two second routing nodes are connected in sequence, the third uplink child nodes of the at least two second routing nodes are connected in sequence, and the fourth uplink child nodes of the at least two second routing nodes are connected in sequence. Herein, in the same second routing unit, the third downlink child nodes of the at least two second routing nodes may be sequentially cascaded, or may also be interconnected in pairs, or may have other star connection manners, and certainly, the sequential cascading is optimal. Certainly, the third uplink child nodes in the same second routing unit may be sequentially cascaded, or may also be interconnected in pairs, or may have other star connection manners, and certainly, the sequential cascading is optimal. The fourth uplink child nodes in the same second routing unit may be sequentially cascaded, or may also be interconnected in pairs, or may have other star connection manners, and certainly, the sequential cascading is optimal. The fourth downlink child nodes in the same second routing unit may be sequentially cascaded, or may also be interconnected in pairs, or may have other star connection manners, and certainly, the sequential cascading is optimal.

In the above, one end of the third downlink child node is connected with the output end of the first downlink child node, one end of the fourth downlink child node is connected with the output end of the second downlink child node, one end of the third uplink child node is connected with the input end of the first uplink child node, and one end of the fourth uplink child node is connected with the input end of the second uplink child node; the other end of each of the third downlink child node, the fourth downlink child node, the third uplink child node and the fourth uplink child node is connected to the corresponding slave functional unit 41 respectively. Specifically, each of the output end of the third downlink child node and the output end of the fourth downlink child node is connected to the corresponding slave functional unit 41 respectively. Each of the input end of the third uplink child node and the input end of the fourth uplink child node is connected to the corresponding slave functional units 41 respectively.

Herein, In the present application, downlink means a direction of data flow from the master functional unit to the slave functional unit, and uplink means a direction of a data amount from the slave functional unit to the master functional unit.

Figure 2:
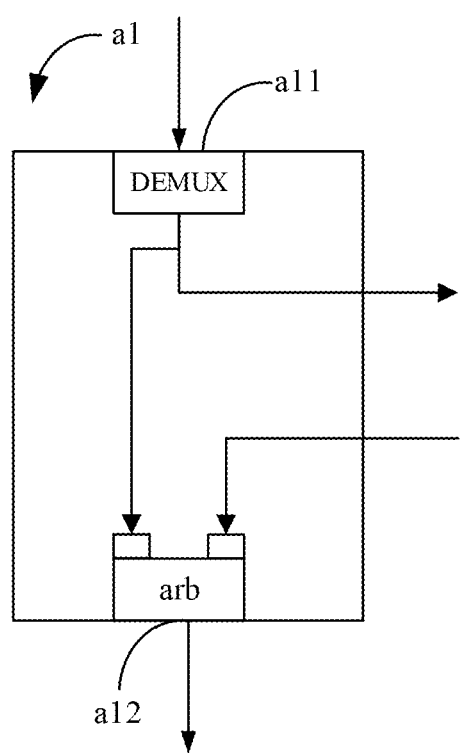
FIG. 2 is a schematic structural diagram of a first preset child node of an AXI bus structure according to some embodiments of the present application.

In the above, as shown in FIG. 2, a first preset child node a1 includes a master demultiplexer a11 and at least one master arbiter a12. Herein, the master demultiplexer a11 is configured to access information transmitted by other nodes connected thereto, and transmit the information to the master arbiter a12 or another node connected thereto. The master arbiter a12 is configured to receive the information transmitted by the master demultiplexer a11 or the information transmitted by other nodes, and output the information to other nodes connected thereto. For example, only one master arbiter a12 is included in FIG. 2. The rightmost first preset child node in FIG. 4 includes two master arbiters a12.

Figure 3:
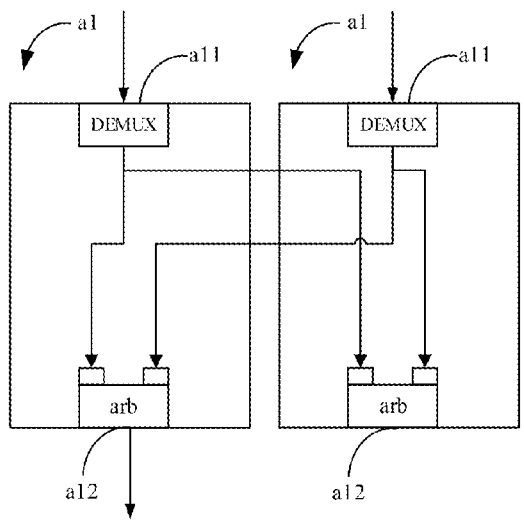
FIG. 3 is a schematic diagram of a first connection structure of first preset child nodes of an AXI bus structure according to some embodiments of the present application.
Figure 4:
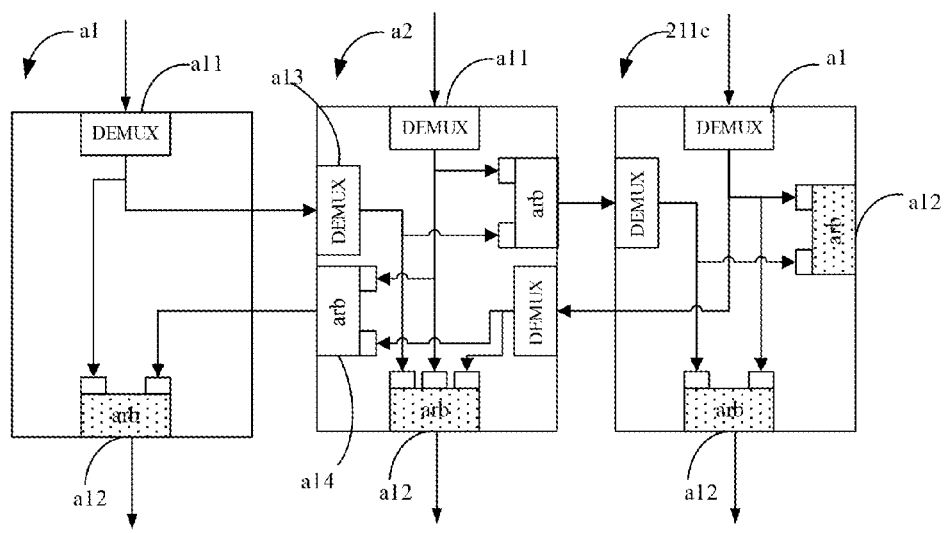
FIG. 4 is a schematic diagram of a first connection structure of a first preset child node and a second preset child node of an AXI bus structure according to some embodiments of the present application.
Figure 5:
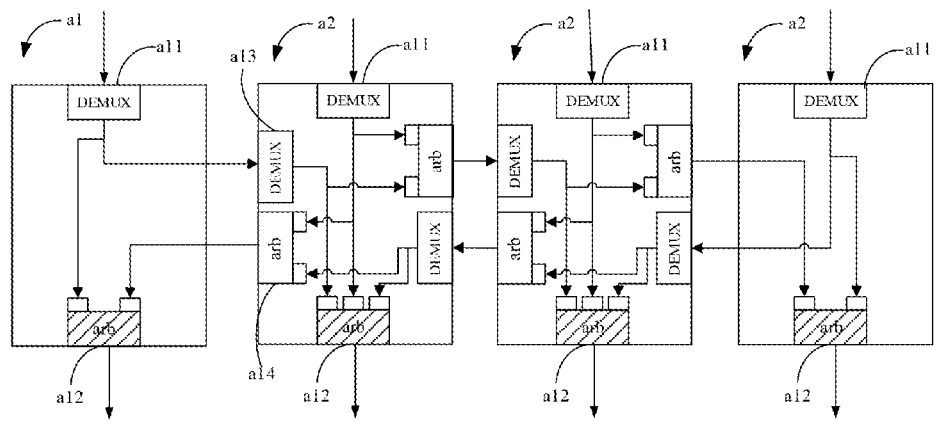
FIG. 5 is a schematic diagram of a second connection structure of a first preset child node and a second preset child node of an AXI bus structure according to some embodiments of the present application.

In the above, node types of the first preset child node a1 may be: the first uplink child node, the first downlink child node, the second uplink child node, the second downlink child node, the third uplink child node, the third downlink child node, the fourth uplink child node or the fourth downlink child node, wherein a number of the same type of first preset child nodes connected with the first preset child node is one. For example, for the first uplink child node of the first preset child node a1, a number of the first uplink child nodes connected thereto is one. In FIGS. 2, 3 and 4, each of the child nodes at both ends is connected to only one child node of the same type, and thus is the first preset child node.

Certainly, it may be understood that for some first preset child nodes a1 provided with two master demultiplexers a11, a bypass demultiplexer a13 is required to be provided to receive information sent from other nodes. This information is then sent to the master arbiter, and the master arbiter sends the received information in sequence.

FIG. 3 shows a node network formed by two first preset child nodes a1 of the same type. For example, FIG. 3 may correspond to the connection relationship of the same type of child nodes of two second routing nodes in the second routing unit in FIG. 1.

Herein, as shown in FIG. 4, a second preset child node a2 includes a master demultiplexer a11, at least one master arbiter a12, at least one bypass demultiplexer a13 and at least one bypass arbiter a14. Herein, the master demultiplexer a11 is configured to access information transmitted by other nodes connected thereto, and transmit the information to the corresponding master arbiter a12, the bypass arbiter a14, and/or other child nodes; for example, in FIG. 4, for the second left child node, the bypass demultiplexer a13 on the left in the second preset child node a2 selectively distributes the information received from the first preset child node a1 to the master arbiter a12 or an the bypass arbiter a14 on the right.

In the above, the master arbiter a12 may be configured to receive the information sent by the master demultiplexer and the bypass demultiplexer a13, and output the information to other nodes connected to the second preset child node.

Herein, the bypass demultiplexer a14 may be configured to access information sent by other child nodes, and send the information to the master arbiter a12 or the bypass arbiter a13;

herein, the bypass arbiter a13 may be configured to access information transmitted by the master demultiplexer a11 and the bypass demultiplexer a14, and transmit the information to other nodes connected thereto.

In the above, node types of the second preset child node may be: the first uplink child node, the first downlink child node, the second uplink child node, the second downlink child node, the third uplink child node, the third downlink child node, the fourth uplink child node or the fourth downlink child node, wherein a number of the same type of second preset child nodes connected with the second preset child node is at least two. For example, the middle child node in FIG. 3 is connected to two child nodes beside it, and is a second preset child node. Each of the middle two child nodes in FIG. 4 is connected to two child nodes, therefore the middle two child nodes in FIG. 4 are second preset child nodes.

Herein, in the present application, the arbiter may be configured to sequentially send the information received from at least two paths to the next node. The demultiplexer is configured to distribute the information received from one path to at least one node connected thereto.

Figure 6:
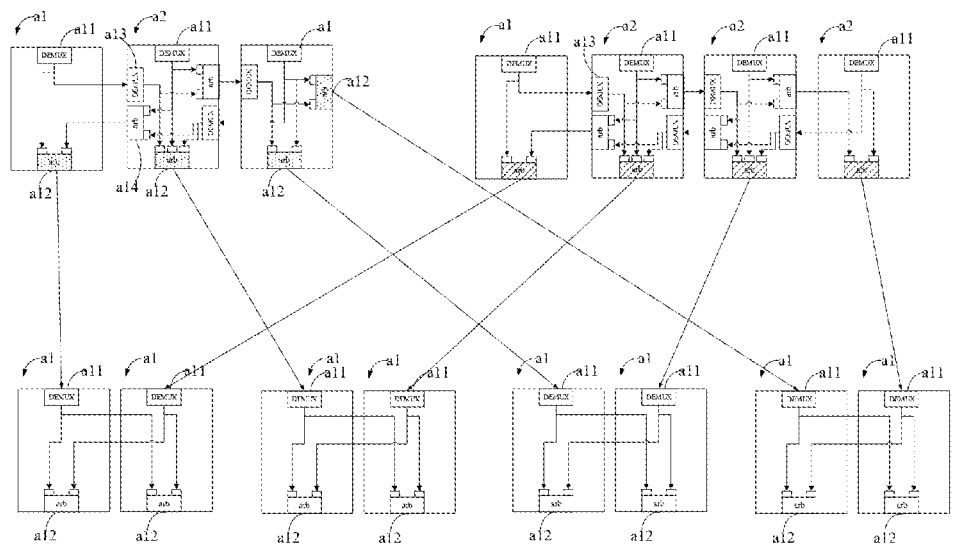
FIG. 6 is a diagram of a child node connection structure of one channel of an AXI bus structure according to some embodiments of the present application.

FIG. 6 shows a diagram of a connection relationship of child nodes of the second routing unit and the first routing unit on a downlink channel in the present application, and certainly, for a diagram of a connection relationship of a corresponding uplink channel thereof, only an adaptive adjustment is required.

Herein, different first routing nodes 21 and second routing nodes 31 are provided with different numbers of FIFO queues respectively, and depths of the FIFO queues on different first routing nodes 21 are different. In addition, depths of the FIFO queues on different second routing nodes 31 are different.

Herein, each of the child nodes of the first routing node 21 has a function of splitting a burst length of the AXI bus into plural segments, such that the burst length may be reduced.

It may be understood that the AXI bus 100 includes a write address channel, a write data channel, a read address channel, a read data channel, and a write reply channel. That is, the write address/data channel is divided into two channels: the write address channel and the write data channel.

Herein, in some embodiments, signal transmission directions of the write address/data channel and the read address channel are the same, and depths of FIFO configuration of the same first routing node on different channels are the same. Therefore, the child nodes of the same first routing node or second routing node on the write address/data channel and the read address channel may have the same structure.

From the above, in the AXI bus structure according to the embodiment of the present application, plural master functional units are grouped into one group, plural slave functional units are grouped into one group, and the plural master functional units in one group share one routing network formed by plural first routing units to interact with a routing network formed by plural second routing units, so as to realized access to each slave functional unit, thereby reducing a number of the interconnected AXI buses, and eliminating a congestion problem of back-end implementation of the chip.

An embodiment of the present application further provides a chip system, including the AXI bus structure according to any of the above embodiments.

The above description is only embodiments of the present application and is not intended to limit the protection scope of the present application, and various modifications and changes may be made to the present application by those skilled in the art. Any modification, equivalent replacement, or improvement made within the spirit and principle of the present application shall be included in the protection scope of the present application.

INDUSTRIAL APPLICABILITY

The present application provides the AXI bus structure and the chip system. The AXI bus structure includes: the at least two master functional unit groups, each of the master functional unit groups including the at least two master functional units; the at least two first routing units, the at least two master functional unit groups being in one-to-one correspondence with the at least two first routing units, and each of the first routing units being respectively connected to each of the master functional units of the corresponding master functional unit group by means of the AXI bus; the at least two second routing units, each of the second routing unit being respectively connected to each of the first routing units by means of the AXI bus; the at least two slave functional unit groups, each of the slave functional unit groups including the at least two second slave functional units, the at least two slave functional unit groups being in one-to-one correspondence with the at least two second routing units, and each of the second routing units being respectively connected to each of the slave functional units of the corresponding slave functional unit group by means of the AXI bus.

Furthermore, it may be understood that the AXI bus structure and the chip system according to the present application are reproducible and may be applied in various industrial applications. For example, the AXI bus structure and the chip system according to the present application may be applied in the field of chip technologies.

What is claimed is:

1. An AXI bus structure, comprising:
at least two master functional unit groups, wherein each of the master functional unit groups comprises at least two master functional units;
at least two first routing units, wherein the at least two master functional unit groups are in one-to-one correspondence with the at least two first routing units, and each of the first routing units is respectively connected to each of the master functional units of the corresponding master functional unit group by means of an AXI bus;
at least two second routing units, wherein each of the second routing units is respectively connected to each of the first routing units by means of the AXI bus; and
at least two slave functional unit groups, wherein each of the slave functional unit groups comprises at least two second slave functional units, the at least two slave functional unit groups are in one-to-one correspondence with the at least two second routing units, and each of the second routing unit is respectively connected to each of the slave functional unit of the corresponding slave functional unit group by means of the AXI bus;

wherein each of the first routing units comprises at least two first routing nodes connected by means of the AXI bus in sequence, and each of the second routing units comprises at least two second routing nodes connected by means of the AXI bus in sequence; and the at least two second routing nodes of each of the second routing units are in one-to-one correspondence with the at least two first routing units respectively, and each of the second routing nodes is connected to one first routing node of the corresponding first routing unit by means of the AXI bus.

2. The AXI bus structure according to claim 1, wherein each of the first routing nodes of any first routing unit is connected to at least one of the second routing nodes corresponding to such first routing unit.

3. The AXI bus structure according to claim 1, wherein the AXI bus comprises a write address/data channel, a read address channel, a read data channel, and a write reply channel;

each of the first routing nodes comprises: a first downlink child node located on the write address/data channel, a second downlink child node located on the read address channel, a first uplink child node located on the read data channel, and a second uplink child node located on the write reply channel;

in the same first routing unit, the first downlink child nodes of the at least two first routing nodes are connected in sequence, the second downlink child nodes of the at least two first routing nodes are connected in sequence, the first uplink child nodes of the at least two first routing nodes are connected in sequence, and the second uplink child nodes of the at least two first routing nodes are connected in sequence; and each of the first downlink child node, the second downlink child node, the first uplink child node, and the second uplink child node has one end connected to one master functional unit of the master functional unit group corresponding to such first routing unit and the other end connected to one second routing node corresponding to such first routing unit respectively.

4. The AXI bus structure according to claim 3, wherein each of the second routing nodes comprises: a third downlink child node located on the write address/data channel, a fourth downlink child node located on the read address channel, a third uplink child node located on the read data channel and a fourth uplink child node located on the write reply channel;

in the same second routing unit, the third downlink child nodes of the at least two second routing nodes are connected in sequence, the fourth downlink child nodes of the at least two second routing nodes are connected in sequence, the third uplink child nodes of the at least two second routing nodes are connected in sequence, and the fourth uplink child nodes of the at least two second routing nodes are connected in sequence; and an input end of the third downlink child node is connected with an output end of the first downlink child node, an input end of the fourth downlink child node is connected with an output end of the second downlink child node, one end of the third uplink child node is connected with the first uplink child node, and one end of the fourth uplink child node is connected with the second uplink child node; the other end of each of the third downlink child node, the fourth downlink child node, the third uplink child node and the fourth uplink child node is connected to the corresponding slave functional unit respectively.

5. The AXI bus structure according to claim 4, wherein a first preset child node comprises a master demultiplexer and a master arbiter;

the master demultiplexer is configured to access information transmitted by nodes connected thereto, and transmit the information to the master arbiter or another node connected thereto;

the master arbiter is configured to receive information transmitted by the demultiplexer or information transmitted by other first preset child nodes, and output the information to other nodes connected thereto; and node types of the first preset child node are: the first uplink child node, the first downlink child node, the second uplink child node, the second downlink child node, the third uplink child node, the third downlink child node, the fourth uplink child node or the fourth downlink child node, wherein a number of the same type of first preset child nodes connected with the first preset child node is one.

6. The AXI bus structure according to claim 4, wherein a second preset child node comprises a master demultiplexer, a master arbiter, a bypass demultiplexer, and a bypass arbiter;

the master demultiplexer is configured to access information transmitted by nodes connected thereto, and transmit the information to the master arbiter, the bypass arbiter, and/or another node connected thereto;

the master arbiter is configured to receive information transmitted by the demultiplexer and information transmitted by the bypass demultiplexer and/or other child nodes, and output the information to the nodes connected thereto;

the bypass demultiplexer is configured to access information transmitted by other nodes connected thereto, and transmit the information to the master arbiter or the bypass arbiter;

the bypass arbiter is configured to access information transmitted by the master demultiplexer and the bypass demultiplexer, and transmit the information to other nodes connected thereto; and node types of the second preset child node are: the first uplink child node, the first downlink child node, the second uplink child node, the second downlink child node, the third uplink child node, the third downlink child node, the fourth uplink child node or the fourth downlink child node, wherein a number of the same type of second preset child nodes connected with the second preset child node is at least two.

7. The AXI bus structure according to claim 1, wherein at least one master functional unit of the master functional unit groups is a processor, an accelerator, a coprocessor, or a DMA controller.

8. The AXI bus structure according to claim 1, wherein at least one of the slave functional unit groups is a memory, and the slave functional unit is one unit of the memory.

9. The AXI bus structure according to claim 3, wherein a different first routing nodes are provided with different numbers of first in first out (FIFO) queues, and depths of the FIFO queues on different first routing nodes are different.

10. The AXI bus structure according to claim 3, wherein different second routing nodes are provided with different numbers of first in first out (FIFO) queues, and depths of the FIFO queues on different second routing nodes are different.

11. A chip system, comprising the AXI bus structure according to claim 1.

12. The AXI bus structure according to claim 2, wherein the AXI bus comprises a write address/data channel, a read address channel, a read data channel, and a write reply channel;
  each of the first routing nodes comprises: a first downlink child node located on the write address/data channel, a second downlink child node located on the read address channel, a first uplink child node located on the read data channel, and a second uplink child node located on the write reply channel;
  in the same first routing unit, the first downlink child nodes of the at least two first routing nodes are connected in sequence, the second downlink child nodes of the at least two first routing nodes are connected in sequence, the first uplink child nodes of the at least two first routing nodes are connected in sequence, and the second uplink child nodes of the at least two first routing nodes are connected in sequence; and
  each of the first downlink child node, the second downlink child node, the first uplink child node, and the second uplink child node has one end connected to one master functional unit and the other end connected to the corresponding one second routing node respectively.

13. The AXI bus structure according to claim 5, wherein a second preset child node comprises a master demultiplexer, a master arbiter, a bypass demultiplexer, and a bypass arbiter;
  the master demultiplexer is configured to access information transmitted by nodes connected thereto, and transmit the information to the master arbiter, the bypass arbiter, and/or another node connected thereto;
  the master arbiter is configured to receive information transmitted by the demultiplexer and information transmitted by the bypass demultiplexer and/or other child nodes, and output the information to the nodes connected thereto;
  the bypass demultiplexer is configured to access information transmitted by other nodes connected thereto, and transmit the information to the master arbiter or the bypass arbiter;
  the bypass arbiter is configured to access information transmitted by the master demultiplexer and the bypass demultiplexer, and transmit the information to other nodes connected thereto; and
  node types of the second preset child node are: the first uplink child node, the first downlink child node, the second uplink child node, the second downlink child node, the third uplink child node, the third downlink child node, the fourth uplink child node or the fourth downlink child node, wherein a number of the same type of second preset child nodes connected with the second preset child node is at least two.

14. The AXI bus structure according to claim 1, wherein at least one master functional unit of the master functional unit groups is a processor, an accelerator, a coprocessor, or a DMA controller.

15. The AXI bus structure according to claim 2, wherein at least one master functional unit of the master functional unit groups is a processor, an accelerator, a coprocessor, or a DMA controller.

16. The AXI bus structure according to claim 3, wherein at least one master functional unit of the master functional unit groups is a processor, an accelerator, a coprocessor, or a DMA controller.

17. The AXI bus structure according to claim 4, wherein at least one master functional unit of the master functional unit groups is a processor, an accelerator, a coprocessor, or a DMA controller.

18. The AXI bus structure according to claim 5, wherein at least one master functional unit of the master functional unit groups is a processor, an accelerator, a coprocessor, or a DMA controller.

19. The AXI bus structure according to claim 6, wherein at least one master functional unit of the master functional unit groups is a processor, an accelerator, a coprocessor, or a DMA controller.

* * * * *